C. H. RADCLIFFE.
FISHHOOK HOLDER.
APPLICATION FILED NOV. 7, 1918.
1,315,986.
Patented Sept. 16, 1919.
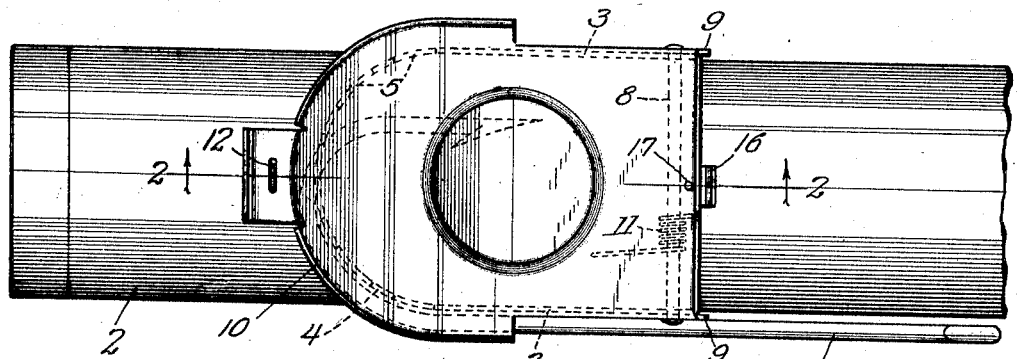
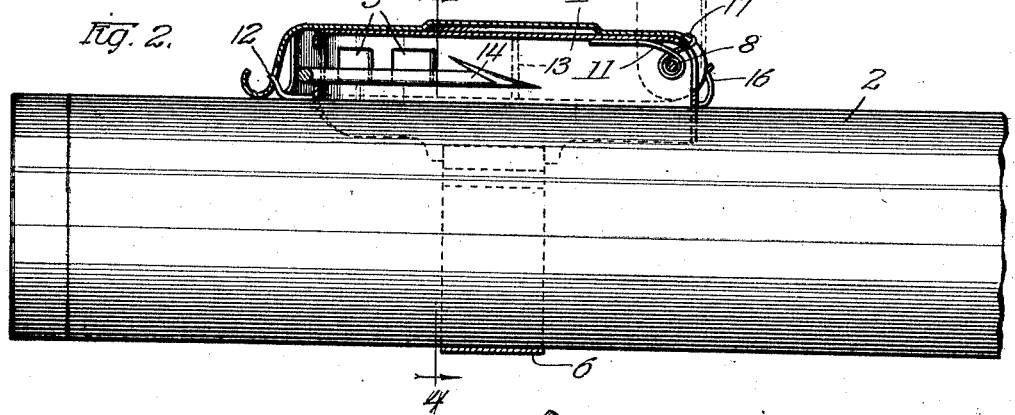
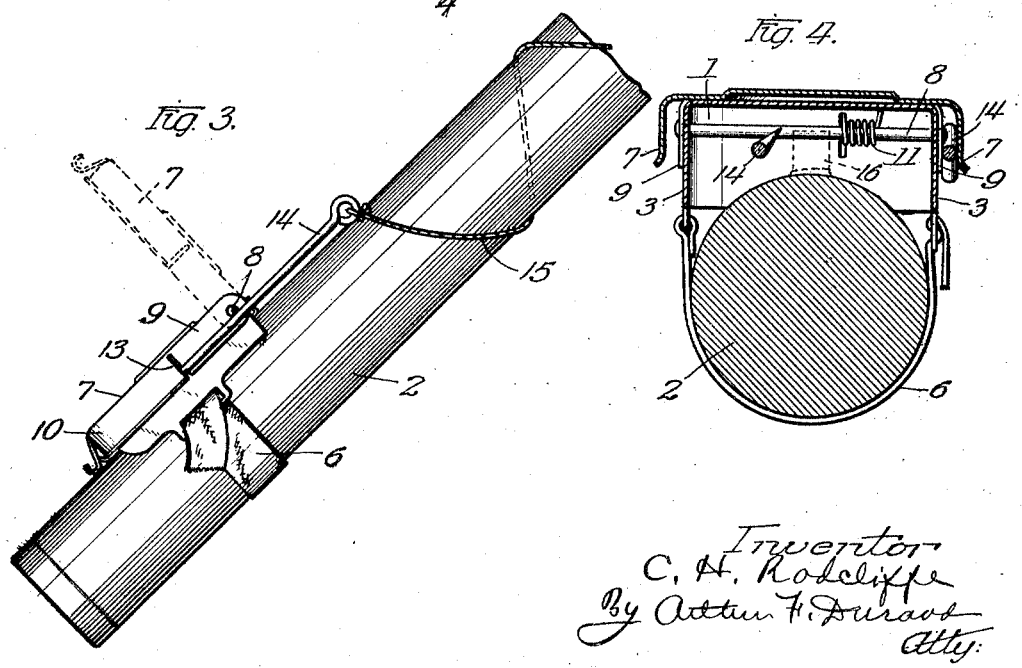
Inventor
C. H. Radcliffe

UNITED STATES PATENT OFFICE.

CHARLES H. RADCLIFFE, OF CHICAGO, ILLINOIS.

FISHHOOK-HOLDER.

1,315,986. Specification of Letters Patent. Patented Sept. 16, 1919.

Application filed November 7, 1918. Serial No. 261,436.

*To all whom it may concern:*

Be it known that I, CHARLES H. RADCLIFFE, a citizen of the United States of America, and a resident of Chicago, Illinois, have invented a certain new and useful Improvement in Fishhook-Holders, of which the following is a specification.

The invention relates to devices for holding or retaining a fish hook which is on the line of a fishing rod, thereby to prevent the hook from swinging around, and so that the point of the hook will be protected against injury and will be covered to prevent it from catching on clothing or other things.

Generally stated, the object of the invention is to provide a novel, simple and comparatively inexpensive device which can be easily fastened to a fishing rod, and which will have provisions for retaining the fish hook therein, so that the line and the hook cannot swing around, and whereby the fish hook is easily inserted and easily withdrawn when desired for use.

It is also an object to provide certain details and features of construction tending to increase the general efficiency and the desirability of a fish hook holder of this particular character.

To these and other useful ends the invention consists in matters hereinafter set forth and claimed, and shown in the accompanying drawings, in which—

Figure 1 is a plan of a fish hook holder embodying the principles of the invention, showing a portion of the fishing rod to which the device is attached.

Fig. 2 is a longitudinal section of said device on line 2—2 in Fig. 1.

Fig. 3 is a side elevation of said device and the adjacent portion of the fishing rod, on a smaller scale, showing the cover of the device in raised position in dotted lines.

Fig. 4 is a cross section on line 4—4 in Fig. 2.

As thus illustrated, the invention comprises a hollow body 1 made of sheet metal and shaped to fit one side of the fishing rod 2, said body having side walls 3 and a rounded end wall 4, the latter having a plurality of openings 5 arranged in a row from one side of the body to the other. Said body is provided with a strap 6, or with any suitable means, for attaching it to the side of the fishing rod. A cover 7 is pivoted at 8 to the upper end of the body 1, so that it is hinged to swing up and down. This cover is shaped to conform to the body 1, being provided with side walls 9 which are set close to said body, and with a rounded end wall 10 which conforms to the curve of the wall 4, but which is disposed a slight distance therefrom. A spring 11 is applied to the pivot or hinge of the cover to yieldingly hold the latter in closed position, and in addition the cover has a catch 12 by which it is latched in closed position, so that when closed the cover is not liable to be accidentally opened. It will be seen that the cover is provided with a notch 13 at each side thereof.

In use the device is strapped to the fishing rod, in the manner shown. When the fish hook 14 on the end of the line 15 is inserted through one of the openings 5, depending upon the size and shape of the hook, the cover 1 is then closed down to prevent displacement of the hook. The barb and point and the curved portion of the hook are fully inclosed, it will be seen, but the shank of the hook remains exposed, so that the hook can be grasped by one hand while the cover is raised with the other when it is desired to release the hook. When the cover is closed, the side wall 9 will occupy a position inside of the shank of the hook, but the curved portion of the hook will be inside of the cover, as shown, and in this way the point of the hook within the hollow body is protected, and is prevented from catching on the clothing or other things. With the openings 5 disposed in different positions from one side of the body 1 to the other, it is obvious that either a small hook or a large hook can be held in the device, the hook occupying the opening which is found to be suitable and convenient for that purpose. The hook cannot shift around to any great extent, and cannot turn over or turn around, and in this way the point and barb will always occupy a safe position within the hollow body.

The cover 7 can be hinged in any suitable or desired manner, and may have the hinge and spring so constructed and arranged that the cover will be yieldingly held in open position, after being forcibly opened, as well as in closed position. For example, a small catch 16 can be provided at the upper end of the hollow body 1 to engage the small projection 17 on the cover, when the latter is open, thereby retaining the cover in open position; but from this position the cover can be closed by forcibly pushing it down so as to disengage the projection 17 from the catch 16, in a manner that will be readily understood. Obviously, however, any suitable means can be employed for this purpose.

With the construction shown and described, it will be seen that the hook is retained flatwise in a plane parallel with the plane of the body and swinging guard, and that the latter swings toward and away from the fishing rod. Therefore, the hook and the body and the guard, as well as the axis 8 of the guard, are all in substantially the same plane, or in parallel planes, when the hook is held in place. A portion of the hook is concealed, and a portion of the hook is held by the guard against the exterior of the sheet metal body, so that by raising the guard 7, the shank of the hook can be grasped to disengage the sharp portion from the opening in the body.

From the foregoing it will be seen that the openings 5 each constitute a restricted entrance into the cavity within the body of the device, and through which the sharp portion of the hook is introduced into the cavity. When the hook is clamped in place by the swinging guard, the sharp portion of the hook is then left free within said cavity, as the sharp portion is not gripped or held by any portion of the device, and is not liable to be injured. Also, the cavity is large enough to permit the insertion of not only a bare hook, but also a hook with some bait thereon, should it be desired to use the device in this manner.

What I claim as my invention is:—

1. In a device to hold a fish hook which is on the end of the line of a fishing rod, a hollow sheet metal body adapted for attachment to said rod and having provisions to receive and inclose the sharp portion of the hook, so that the point of the hook is protected, and means forming a hinged guard for engaging and retaining a portion of the hook against the exterior of said body to hold the hook in place.

2. A device as specified in claim 1, said provisions comprising a curved wall having a plurality of openings for hooks of different shapes or sizes, and said means comprising a hinged cover which leaves the shank of the hook exposed and which is shaped to extend close to said wall and to retain the hook in any one of said openings.

3. The structure covered by claim 2, in which said cover has a notch at the side for the shank of the hook, said cover being hinged at the upper end of said body, and said wall with its openings being at the lower end of the body.

4. A device as specified in claim 1, said provisions comprising a wall having openings therein to receive hooks of different sizes or shapes, leaving the shank of the hook exposed.

5. In a device of the class described, the combination of a hollow body having provisions at its lower end to retain a fish hook, a cover hinged to the upper end of said body and adapted to close down around the body to prevent displacement of the hook, and means to hold the cover in closed position, said body and cover inclosing the barb and curved portion of the hook, the cover holding a portion of the hook against the exterior of said body, leaving the shank of the hook exposed.

6. In a device to hold a fish hook which is on the end of the line of a fishing rod, the combination of a sheet metal body, means for fastening the body to the fishing rod, and a guard hinged on the body to swing toward and away from the fishing rod, said body having a cavity to inclose the sharp portion of the hook, and a restricted opening through which the point of the hook enters said cavity, whereby the sharp portion is free inside, and so that the hook is held flatwise in a plane between the rod and guard, and said guard being formed to retain the hook in place with a portion thereof inside the body and a portion outside.

7. A structure as specified in claim 6, said cavity being defined by a curved wall with a plurality of openings therein so that hooks of different sizes can be retained in place at either side of the body, and said guard being curved to conform to the curve of said wall.

8. A structure as specified in claim 6, the shank of the hook being disposed outside of said body, and said retaining portion holding the hook against the exterior of said body, so that the guard and hook are disposed in planes which are parallel.

9. In a fish-hook holder, a body having means to provide a cavity to inclose the sharp portion of the hook, with a restricted opening forming an entrance for said cavity, so that the sharp portion is free inside, and a guard to retain the hook in place, said guard having means to engage the hook to keep a portion thereof against the exterior of the body.

10. A structure as specified in claim 9, said guard being shaped to form a cover to partially inclose said body.

11. A structure as specified in claim 9, said guard being hinged and formed with portions extending at opposite sides of said body, so that the hook can be retained at either side of the body.

12. A fish-hook holder comprising a sheet metal body of box-like form to engage the hook, having a cavity for inclosing the sharp portion of the hook, and means for retaining the shank of the hook at either side of the body.

13. In a fish-hook holder, a body having means to provide a cavity to inclose the sharp portion of the hook, and a guard to retain the hook in place, said guard having means to engage the hook to keep a portion thereof against the exterior of the body, said guard being shaped to form a cover to partially inclose said body.

14. In a fish-hook holder, a body having means to provide a cavity to inclose the sharp portion of the hook, and a guard to retain the hook in place, said guard having means to engage the hook to keep a portion thereof against the exterior of the body, said guard being hinged and formed with portions extending at opposite sides of said body, so that the hook can be retained at either side of the body.

CHARLES H. RADCLIFFE.

Copies of this patent may be obtained for five cents each, by addressing the "Commissioner of Patents, Washington, D. C."